US009833795B2

(12) United States Patent
Tucker et al.

(10) Patent No.: US 9,833,795 B2
(45) Date of Patent: Dec. 5, 2017

(54) CASCADED AXIAL FLUID SEPARATOR METHODS AND SYSTEMS

(71) Applicant: The United States of America, as represented by the Secretary of the Navy, Washington, DC (US)

(72) Inventors: John E. Tucker, Centreville, VA (US); Paul L. Howard, Newmarket, NH (US); John F. Reintjes, Alexandria, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/162,275

(22) Filed: May 23, 2016

(65) Prior Publication Data
US 2016/0263588 A1 Sep. 15, 2016

Related U.S. Application Data

(63) Continuation-in-part of application No. 14/310,968, filed on Jun. 20, 2014, now Pat. No. 9,345,990.
(Continued)

(51) Int. Cl.
*B01D 17/02* (2006.01)
*B04C 5/14* (2006.01)
(Continued)

(52) U.S. Cl.
CPC ............ *B04C 5/14* (2013.01); *B01D 17/02* (2013.01); *B01D 17/0208* (2013.01);
(Continued)

(58) Field of Classification Search
CPC ............ B01D 19/0057; B01D 21/265; B01D 17/0217; B04C 5/14; B04C 5/26
See application file for complete search history.

(56) References Cited

U.S. PATENT DOCUMENTS 3,884,660 A  5/1975  Perry, Jr. et al.
4,282,016 A  8/1981  Tauber et al.
(Continued)

FOREIGN PATENT DOCUMENTS

NO  WO 2008072087 A2 *  6/2008  ............ B01D 17/00
WO  0061208  10/2000
(Continued)

OTHER PUBLICATIONS

EPO Search Report for PCT/US2014043469, dated Dec. 22, 2016.
International Search Report for related application PCT/US2014/43469, dated Oct. 23, 2014, 3 pages.

*Primary Examiner* — Terry Cecil
(74) *Attorney, Agent, or Firm* — US Naval Research Laboratory; Scott G. Bell

(57) ABSTRACT

A method and system for separating multicomponent fluids into components having different buoyancies. A flow shaping member has a helical channel that imparts a helical motion to the fluid, and a separation chamber for separating the moving fluid into a helically moving heavier flow portion and a more buoyant portion along the central axis. A flow receiving member has a first collection horn with a mouth arranged to collect the higher buoyancy fluid and direct the fluid to an outlet. At least one other fluid passageway for carrying lower buoyancy fluid has an inlet surrounding of the collection horn, and directs the fluid to a separate outlet at an end of the separator. Additional collection horns can be arranged concentrically around the first collection horn to collect intermediate buoyancy flows. Cascaded fluid separators can concentrate the higher buoyancy fluid or the denser fluid.

21 Claims, 13 Drawing Sheets

Related U.S. Application Data

(60) Provisional application No. 61/837,745, filed on Jun. 21, 2013.

(51) Int. Cl.
    *B01D 19/00* (2006.01)
    *B01D 21/26* (2006.01)

(52) U.S. Cl.
    CPC ..... *B01D 17/0217* (2013.01); *B01D 19/0057* (2013.01); *B01D 19/0094* (2013.01); *B01D 21/265* (2013.01)

(56) References Cited

U.S. PATENT DOCUMENTS

| | | | |
|---|---|---|---|
| 5,570,744 A | 11/1996 | Weingarten et al. | |
| 5,824,212 A | 10/1998 | Brockhoff | |
| 6,049,381 A * | 4/2000 | Reintjes | G01N 15/0227 356/335 |
| 7,461,692 B1 * | 12/2008 | Wang | B01D 19/0057 166/105.5 |
| 7,921,739 B2 * | 4/2011 | Fjerdingstad | G01N 15/0227 73/61.43 |
| 8,056,400 B2 * | 11/2011 | Reintjes | G01N 1/14 73/64.56 |
| 8,950,590 B2 | 2/2015 | Coffin | |
| 2002/0178924 A1 | 12/2002 | Brown et al. | |
| 2009/0158931 A1 | 6/2009 | Kemoun | |
| 2013/0134108 A1 | 5/2013 | Howard | |

FOREIGN PATENT DOCUMENTS

| | | |
|---|---|---|
| WO | 03002227 | 1/2003 |
| WO | WO-2012092386 A2 | 7/2012 |

* cited by examiner

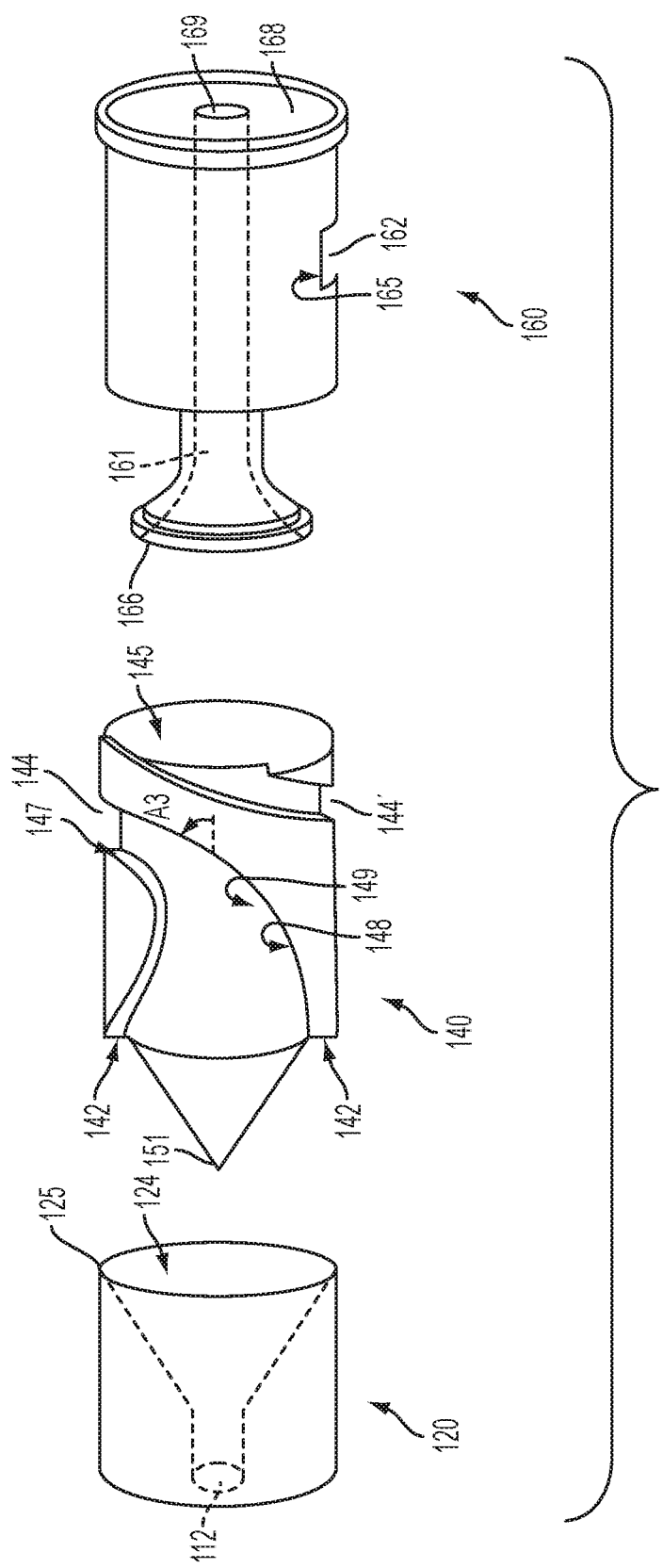

CASCADED AXIAL FLUID SEPARATOR METHODS AND SYSTEMS

CROSS-REFERENCE TO RELATED APPLICATIONS

This application is a continuation in part of U.S. patent application Ser. No. 14/310,968, filed on Jun. 20, 2014, now U.S. Pat. No. 9,345,990, which is a non-provisional under 35 USC 119(e) of, and claims the benefit of, U.S. Provisional Application 61/837,745 filed on Jun. 21, 2013. The entire disclosure of each of these is incorporated herein in its entirety.

BACKGROUND

1. Technical Field

This is related to systems for separating flowing fluid into separate portions, and in particular, to systems for separating solid particles or gases from a liquid or liquids of differing buoyancies.

2. Related Technology

The separation of mixtures into their component parts for the purposes of clarification, cleaning, and removal of undesirable portions of the mixture is a major function in many industries. In many cases it is desired to perform this function rapidly, at high flow rates and in an "on-line" operating mode. In many applications this function is performed by conventional centrifuges, often augmented with a settling or decanting process to overcome the inherent limitations of current centrifuges to achieve the desired level of end product purity needed.

In addition, the removal of air or other gases from fluid flows is widely applicable in cases in which the entrained gases may interfere with the function and performance of equipment. One application is in the removal of air from liquid coolant to improve the heat exchange performance of radiators. Another such application is the removal of air from lubricating fluid to improve the lubrication and cooling performance of the fluid. Yet another application is the removal of air from hydraulic fluid to improve the force transfer of hydraulic actuators. In all of these applications, the separated air or gas is typically removed, since recombination would tend to defeat the purpose of the removal. In these cases, air removal is the primary function and any suspended particles in the fluid are of little or no interest.

In other cases, recombination after separation may be desirable, for example, to retain oil fumes that are entrained in the airflow in order to preserve the total oil content of the system. In certain particle monitoring applications, such as that disclosed by U.S. Pat. No. 4,282,016 to Tauber et al., a goal is to remove particles above a certain size for analysis.

Real time suspended particle monitors are disclosed in U.S. Pat. No. 5,572,320, U.S. Pat. No. 6,049,381, U.S. Pat. No. 7,921,739, and U.S. Pat. No. 8,056,400.

BRIEF SUMMARY

A method and system for separating a multicomponent fluid into two or more flow channels, each containing components with different buoyancy. The system includes a housing having a fluid inlet at a first end and at least two outlets; a first member configured to fit within the housing at the first end of the housing and having a passageway from the inlet through the member, the first member having a concave inner surface; a second member having a convex surface at one end that fits into the concave inner surface, the second member having at least one helical channel in an outer cylindrical surface extending from the convex surface to an opposite end of the second member; and a third member having a central fluid passageway for carrying higher buoyancy fluid and extending through the member along a central axis, and at least one other fluid passageway for carrying lower buoyancy fluid with an inlet positioned radially outward of the inlet of the central fluid passageway; the first member, the second member, and the third member configured to fit within the housing and aligned along a central longitudinal axis.

A method and system for separating a multicomponent fluid into two or more flow channels, each containing components with different buoyancy. The system includes a housing having a fluid inlet at a first end and at least two outlets; a flow forming member configured to fit within the housing at the inlet end of the housing and having a flow passage therethrough with at least one helical channel in an outer cylindrical surface that directs the fluid into a helical flow direction near the outer circumference of the flow forming member as the fluid exits the flow forming member; and a flow receiving member configured to fit within the housing at an opposite end of the housing, having a central fluid passageway for carrying higher buoyancy fluid and extending through the member along a central axis, and at least one other fluid passageway for carrying lower buoyancy fluid with an inlet positioned radially outward of the inlet of the central fluid passageway; wherein a separation chamber is formed between faces of the flow forming member and the flow receiving member. In operation, the helical flow enters the separation chamber, and more buoyant portions of the flow move toward a central axis of the chamber and enter the central fluid passageway, and less buoyant portions of the flow continue in a helical path near the outer part of the chamber and bypass the entrance of the central fluid passageway and exit the system through the at least one other fluid passageway.

A fluid separation method and system for separating a multicomponent fluid into two or more flow channels, each containing components with different buoyancy. The system includes a housing having a fluid inlet at an inlet end, a fluid outlet for heavier fluid at an outlet end opposite the inlet end, and at least one other fluid outlet for lighter fluid; a flow forming member configured to fit within the housing at the inlet end of the housing and having at least one helical channel in an outer cylindrical surface that directs the fluid into a helical flow direction near the outer circumference of the flow forming member as the fluid exits the flow forming member; and a flow receiving member configured to fit within the housing at an opposite end of the housing. The flow receiving member has a first fluid passageway with an inlet positioned at a central axis of the separator to receive lighter fluid, the first fluid passageway extending to the other fluid outlet for lighter fluid, and a second fluid passageway with an inlet positioned radially outward of the first fluid passageway to receive heavier fluid, the second fluid passageway extending to the fluid outlet for heavier fluid. A separation chamber is formed between a face of the flow forming member and the flow receiving member.

A cascaded flow separation method and system having at least a first flow separator and a second flow separator arranged in series, each separator having a central axis with both a fluid inlet and a first axial fluid outlet arranged at opposite ends of the separator along the central axis of the separator, each separator having at least a second fluid outlet, the separator configured to separate fluid portions of different buoyancies into channels leading to the first fluid outlet and the second fluid outlet. The separators are operatively coupled together, with the first axial fluid outlet of the first separator aligned with and connected to the fluid inlet of the second separator. Each separator has a flow forming member with a helical channel on the outer surface thereof, a flow receiving member with concentric collectors configured to receive flow portions of different buoyancies, and a separation chamber arranged between the flow forming member and the flow receiving member.

Additional features and details will be apparent from the following drawing figures and detailed description.

BRIEF DESCRIPTION OF THE DRAWINGS

FIG. 2A shows an exploded view of three components of a flow separation system.

DETAILED DESCRIPTION

Figure 1A:
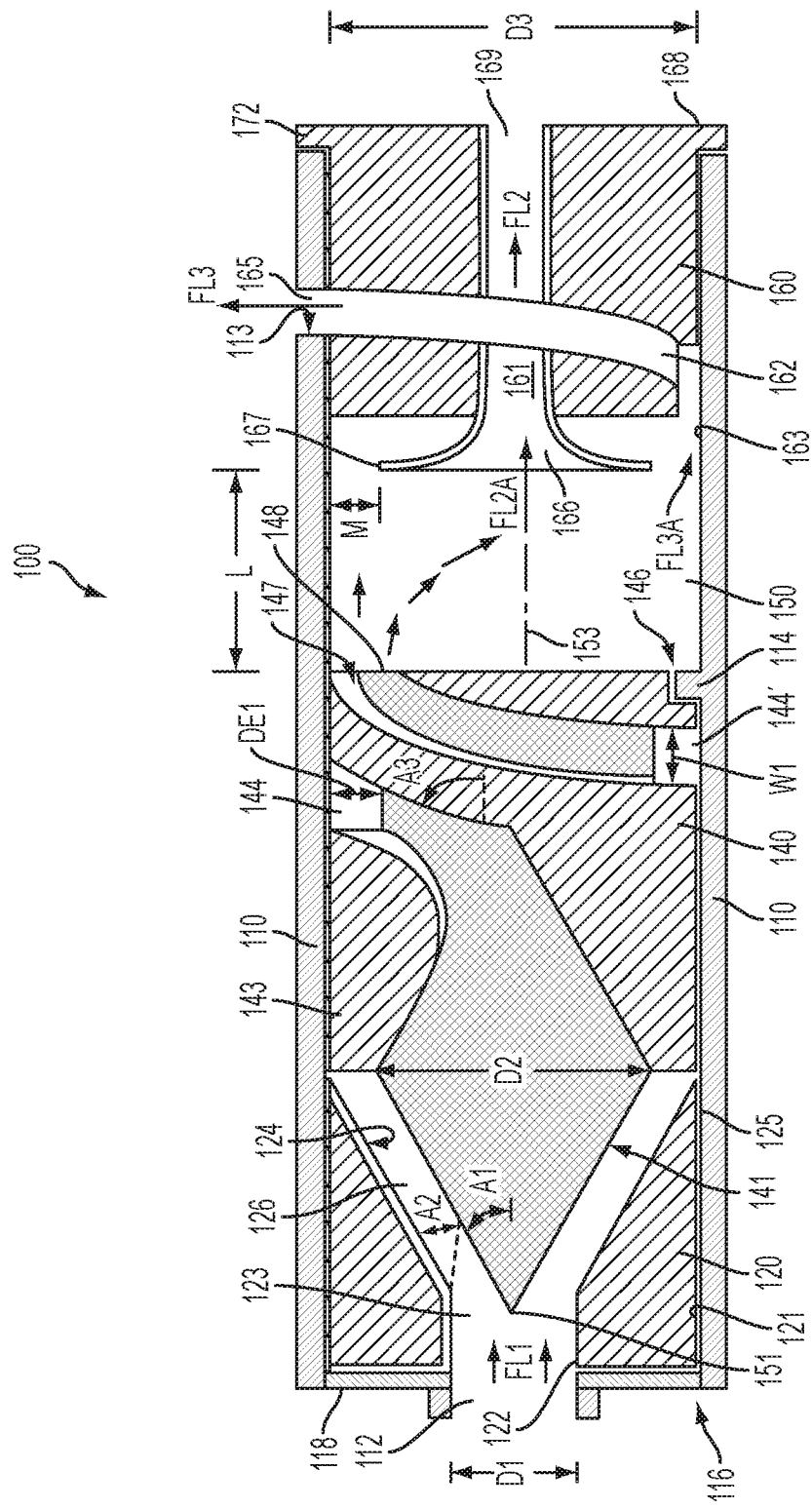
FIG. 1A is a schematic diagram of a flow separation system for separating a fluid flow into two or more channels based on the fluid buoyancy.

The fluid separation systems described herein are suitable for separating fluids or fluids with entrained particles into two or more components based on their densities or buoyancies into separate flow channels. In particular, fluid flow can have entrained or suspended components such as solid particles, gases, or fluids of different densities. The components in either or both channels can be analyzed in real time with an on-line monitor. Alternatively, the entrained components in either of the separated channels can be permanently removed from the flow. Following analysis or removal of the entrained particles, the flows in the two channels can be recombined, allowing reconstitution of the full flow at a downstream location.

The fluid separation system described herein can retain the suspended particles in an oil flow while separating the aerated gas. This feature can be an advantageous addition to the operation of real time suspended particle monitors, such as those described in U.S. Pat. No. 5,572,320, U.S. Pat. No. 6,049,381, U.S. Pat. No. 7,921,739, and U.S. Pat. No. 8,056,400, by making these systems operable with aerated flows, thereby expanding their applicability.

In general in the following discussion, the term fluid is intended to encompass liquids, aerated liquids, and gases with or without solid particles in the fluid. The liquid can be, but is not limited to oil, hydraulic fluid, or water. The solid particles can be debris from engine wear, such as but not limited to metal shavings, ceramic particles, or non-metallic particles, can be biological contaminants, can be other contaminants or other solid particles. Entrained gas within the liquid can be air or another gas.

The system may also be suitable for separating multicomponent gases by separating heavier gases from lighter gases, or by separating one component that is in its gaseous state from another component which is in a liquid state. In one example, the system can strip component gases from liquid air. The centrifugal separation system and method can provide higher efficiency than current air separation methods, including distillation techniques.

Entrained solid particles typically are heavier than the liquid in which they are carried. Air or other gases entrained in a liquid are typically lighter than fluid in which they are carried.

In some circumstances, it is desired to deaerate a flowing fluid, without discarding the gaseous portion, by separating the flow into a less dense portion containing a high fraction of the gases and into a denser portion containing a low fraction of the gases, then recombining the flows. In some instances, it is desired to separate a flowing fluid into a first portion containing a high portion of entrained solid particles into one portion of the flow, and a second portion containing few entrained solid particles. In other circumstances, it is desired to separate two different fluids, one heavier than the other, that have been mixed together, into two different channels.

Figure 1B:
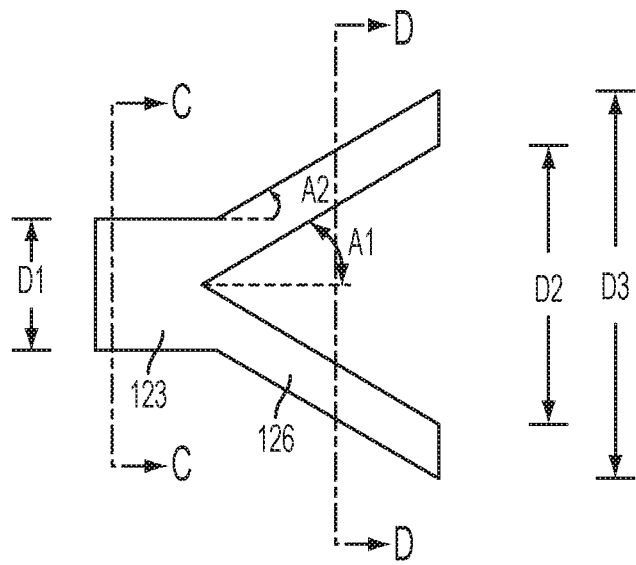
FIGS. 1B, 1C, and 1D show further detail of some internal components of the flow separation system of FIG. 1A.
Figure 1C:
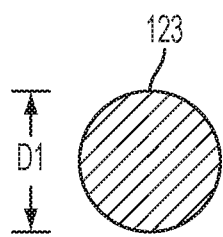
Figure 1D:
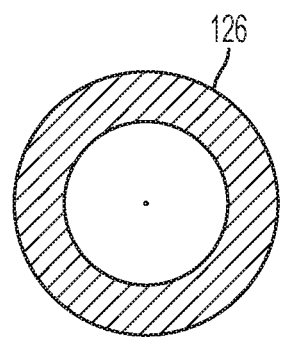

FIG. 1A is a cutaway view of a fluid separation system 100 for separating a fluid flow into two or more separate flows based on buoyancy of the flow components. FIGS. 1B, 1C, and 1D show further detail of some internal components of the fluid separation system 100. In this example, the separation system 100 is suitable for separating a flowing fluid that has entrained or suspended components such as solid particles and gases. Thus, the separation system 100 shown in FIG. 1A is also suitable for deaerating a fluid, that is, for separating the gases within a liquid from the liquid itself.

In the exemplary fluid separation system 100, a plurality of components are aligned along a common axis and positioned within a housing 110. In this example, the housing 110 has a generally cylindrical interior surface an approximately constant inner diameter D3 and an inlet opening 112 at first end along the central axis for receiving the fluid flow to be separated. Note that in the illustration of FIG. 1A, the half of the housing 110 that faces the viewer has been cut away so that the internal components can be seen. The outer surface of the housing can have various shapes depending on the application, including cylindrical and rectangular.

Figure 2B:
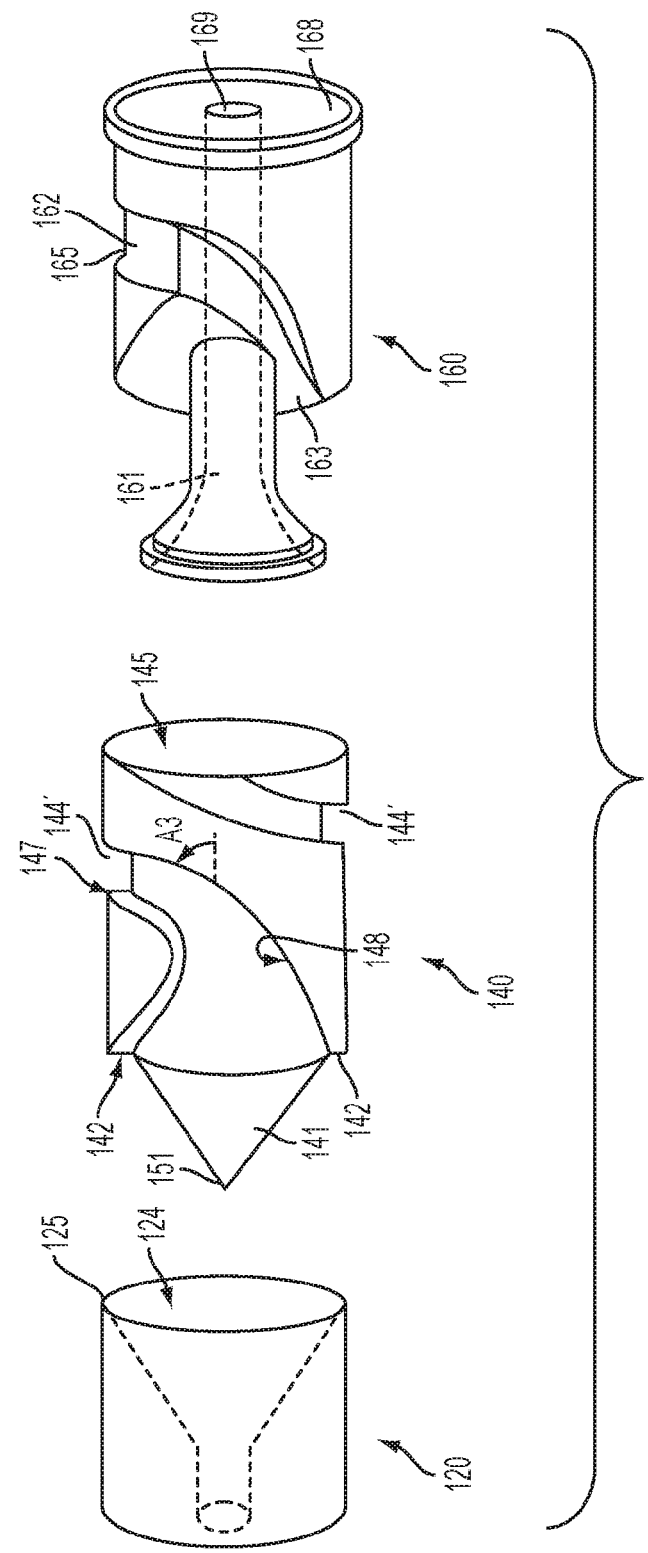
FIG. 2B illustrates the three components of FIG. 2A with the third component rotated to show the opposite surface.
Figure 3:
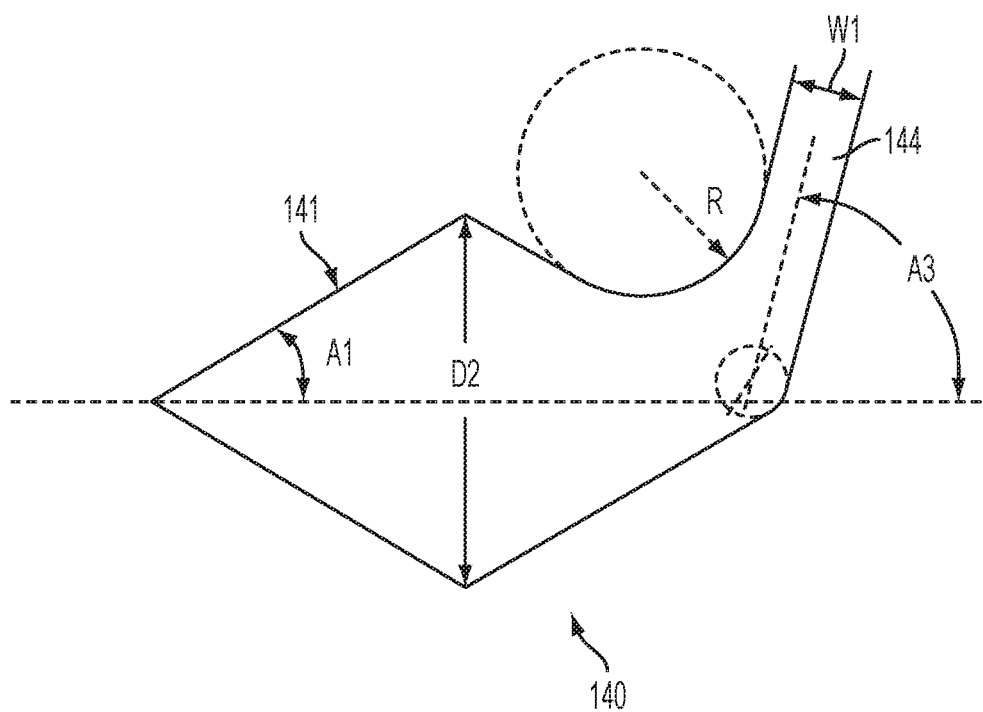
FIG. 3 shows some details of the geometry of one of the components of the flow separation system.

FIG. 2A and FIG. 2B show three components 120, 140, 160 of the flow separation system 100 that fit within the housing 110. FIG. 3 shows some details of the geometry of the member 140.

The first of the three components positioned within the housing 110 is a cup-shaped member 120 having an outer cylindrical surface 121 shaped to fit within the inner diameter D3 of the housing 110. A central axial passageway 123 with a diameter D1 extends from the inlet end 122 that abuts the inner surface of the inlet end 116 of the housing 110 and opens into a concave internal surface 124 that extends to the far end 125 of the member 120. The internal surface 124 forms a cavity and has a diameter that increases in the flow direction.

The cup-shaped member 120 should fit within the housing tightly enough that little or no flow will bypass the passageway 123 by flowing between the outer surface of the member 120 and the inner surface of the housing 110, but loose enough that it can easily be inserted and removed from the housing 110. In this example, the cup-shaped member is inserted into the housing 110 through the inlet end 116 of the housing 110 and held inside the housing by an end cap 118, although other configurations are also envisioned.

Also positioned within the housing is a second member 140 having a convex portion 141 with an apex that faces toward the inlet end, and having a generally cylindrical portion 143 with an outer diameter sized to fit within the housing 110. In this example, the outer diameter of the cylindrical portion is approximately equal to that of the member 120. When the components are assembled, the convex portion 141 extends at least partially into the cavity of the cup-shaped member 120, with a gap of a predetermined size between the surfaces 124 and 141. The convex portion 141 of the member 140 has a maximum diameter that is less than the outer diameter of the member 140. One or more helical slots or channels 144 and 144' wrap around the cylindrical portion 143 of the member 140. The fluid can flow from the gap 126 into the channels 144 formed by the side walls 147, 148, the cylindrical bottom surface 149, and the cylindrical surface of the housing 110. The channels 144 and 144' are opposite each other, and extend approximately one time around the member 140, but in other embodiments, the channels could extend several times around the member. FIG. 3 illustrates the channel geometry. Each of the channels 144 and 144' narrows from the mouth of the channel to a narrower part having a channel width W1 or W1', with each narrower channel portion extending at a helix angle A2 around the member 140.

In one example, the aperture or mouth of each channel 144 and 144' has a width that is almost half the circumference of the cylinder, as seen in FIG. 2A and FIG. 3, with a small end surface 142 formed between the mouths of the channels 144 and 144'. When the member 140 is inserted into the housing 110 the end surface 142 comes into contact with the end 125 of the cup-shaped member 120, maintaining the desired spacing between the surfaces 141 and 124. As seen in FIG. 1A, a gap 126 is formed between the concave internal surface 124 and the convex surface 141. In this embodiment, the gap 126 extends completely around the convex surface 141 of the member 140.

In operation, fluid flows from the inlet 112 in the inlet end 116 of the housing 110, through the passageway 123, and through a gap 126 or space formed between the inner concave surface 124 and the convex surface 141. FIGS. 1A and 1B show the passageway 123 and the gap 126 formed between the members 120 and 140. The gap between the member 140 and the member 120 is of such dimension that the diameter of the flow area in the gap region is greater than the diameter of the inlet. For example, for any point along the gap 126 in FIG. 1B, the flow's radial position, shown in FIG. 1D, will be larger than flow's radial position in the inlet passageway 123 shown in FIG. 1C. The maximum diameter D2 of the convex portion of the member 140 and the angle A1 can be determined based on flow rates, allowable pressure drops, mounting space restrictions, and the required amount of separation between fluid components.

In this example, both the internal concave surface 124 and the convex surface 141 are cones. Here, the convex portion of the member 140 has a vertex angle A1. In this example, the conical surfaces of the member 120 and the member 140 have equal vertex angles, so the gap has approximately the same radial distance between surfaces 124 and 141 over the length of the conical portion 141. However, the separation between surfaces 124 and 141 could be increased or decreased by setting the vertex angles to be different, depending on the design parameters discussed above. In addition, the surfaces and 141 can be other shapes instead of cones, with constant, increasing, or decreasing gap radial separation. It is suitable to select the shape and dimensions of the surfaces to prevent or minimize increases in turbulence of the fluid flow FL1 as it moves through this region and approaches the channels 144 and 144'. As the fluid FL1 passes through the passageway 123 and through the gap 126, it has moved radially outward along the length of the member 120, and has taken on an annular flow shape.

The member 140 should be locked into position to prevent it from moving under the force of the fluid flow. In this example, a pin or protuberance 114 extends outward from the inside cylindrical surface of the housing 110. The cylindrical portion of the member 140 has a groove 146 that engages the pin or protuberance and prevents the member 140 from moving when the fluid flows through the channel 144. Other locking mechanisms are also possible. The convex portion 141 of the member 140 collects and directs the flow to enter the helical channels 144 and 144'. Each channel has a depth and width DE1, W1, DE', and W1', respectively, that can be different but are typically equal. As seen in FIG. 3, one side of a helical channel has a curvature with a radius of curvature R. The channel depths DE1, the widths W1, and helix angles A3 can be calculated based on the speed of the fluid flow FL1 at the inlet and the centrifugal "g-force" to be exerted upon the flow FL1 needed to create the desired amount of flow separation in the separation chamber 150. In this example, the depth DE1 of the channel is defined by the inner diameter of the housing 110 and the cylindrical inner surface of the channel 144, and is approximately constant throughout its length. However, in other embodiments, the channel depth can be varied depending on the design requirements of the application.

A third member 160 is positioned within the housing, with the member 140 being arranged between the member 120 and the member 160, with a separation chamber 150 between the member 140 and the member 160. The chamber is defined by the facing surfaces of the members 140 and 160 and the inner surface of the housing 110. The outer cylindrical surface of the member 160 has a diameter that is approximately the same as that of the members 120 and 140, so it fits within the inner cylindrical surface of the housing 110.

The member 160 has at least two fluid channels. One channel 161 has a centrally arranged passageway with a wide collector horn 166 facing into the chamber 150, and another channel 162 has an inlet 163 that is located radially outward and downstream of the collector 166.

The centrally arranged passageway 161 has an inlet that in this example is a horn shaped collector 166 that extends into the chamber 150 and an outlet 169 at the far end 168 of the member 160. The fluid flow channel 162 has an inlet 163 at the end of the member 160 that faces the chamber 150, at or near the outer surface of the member 160. The fluid flow channel 162 can have a bottom surface formed in the member 160, a top surface defined by the inner surface of the housing 110, and side walls. In this example, the fluid flow channel 162 extends at least partially around the circumference of the member 160 to a second end 165 positioned to direct the fluid flow through an aperture 113 in the housing 110. As discussed in later paragraphs, the horn shaped collector 166 receives a portion of the fluid flow passing through the chamber 150, and the channel opening 163 receives the remaining portion of the fluid flow passing through the chamber 150.

In operation, the fluid with entrained particles or gases enters the inlet passage 123, and flows through the passage 123, through the cone shaped gap and over the conical surface 141 of the member 140. The gap surfaces 124 and 141 direct the fluid into the mouths of the channels 144 and 144', and the fluid continues through the channels 144 and 144'. The helical shape of the channels forces the flow into a helical or spiral flow direction, which continues as the fluid moves from the channels into the chamber 150. The centrifugal force resulting from the spiral flow path of the fluid in chamber 150 causes the heavier, particulate-enhanced portion FL3A of the fluid to flow outward toward the cylindrical wall of the chamber 150 while the more buoyant portion of fluid flow (e.g., the gaseous portion) separates and forms gaseous partial flow FL2A, which is driven by the generated force toward the center axis 153 of the chamber 150. In this example, the end of the horn shaped collector 166 is positioned at a distance L from the entrance to the chamber 150. The horn shaped collector 166 collects the more buoyant portion of the flow FL2A that has been driven toward the central part of the chamber. The heavier portion of the flow FL3A is collected from the region adjacent to the cylindrical wall of the chamber 150 by the opening 163 of the fluid flow channel 162 in the member 160. The distance L affects the dwell time of the flow within the chamber 150, and together with the angle and dimensions of the channel 144 and the helix angle A3, affects the amount of separation between the partial flows FL2A and FL3A. The distance M between the outer rim 167 of the horn shaped collector 166 and the inner wall of the housing 110 affects amount of the more buoyant component in the flow (FL2A) collected by the horn-shaped collector 166, and the amount of the less buoyant component in the remaining flow that enters the fluid flow passage 162 (FL3A).

In this example, the channels 144 and 144' in the member 140 and the channel 162 in the member 160 can each turn in the same direction. In this example, if viewing the members from the apex end 151 of the member 140, flow through all the channels will be in the counterclockwise direction and toward the far end 168 of the member 160. Further, it will be clear that the fluid moves generally in a single direction from the inlet 112 at one end of the system toward the outlets 165 and 169 at or near the far end of the member 160 without reversing course.

The spiral shape of the channel 162 can provide a low-resistance flow path to a side outlet in the housing, which can be suitable for a compact particle analysis system discussed in later paragraphs. However, the channel can extend more directly to the side of the housing, or to the end of the housing, and can be a shape other than spiral or curved.

In this example, the member 160 is held at the desired axial distance from the member 140 and prevented from moving by an end portion 172 that extends in a radial direction past the inner diameter of the housing, or by another securing mechanism.

The design parameters L and M can be selected so the system provides a desired amount of separation efficiency, a desired size range of particles collected in the heavier FL3A flow, and concentration efficiency of the FL3A flow. Thus, the system is widely applicable for a wide range of values of viscosity, particle density, and sizes.

In this example, a single channel 162 is shown radially outward of a single horn shaped collector 166 of a single centrally arranged passageway 161. In other embodiments, additional horn shaped openings and passageways can surround the first horn shaped collector, to collect intermediate buoyancy flow portions. Further, more channels 162 can be included in the member 160 to collect the heavier portion of the fluid flow.

The aperture or mouth of the axial passageway 161 tapers outward, and can be curved in an outward direction as shown in FIGS. 1A, 2A, and 2B or can increase linearly in diameter. It may also be suitable to use a straight pipe extending into the chamber in some circumstances, however, such a straight pipe is expected to collect less of the more buoyant flow component.

The separated flows FL2 and FL3 can be analyzed or processed separately, as discussed in later paragraphs. The flows can then be discarded, maintained separately for further processing, or one or both can be reintroduced into the original system flow path.

In this example, the fluids leaving the flow separation system 100 have different buoyancies. For example, FL-3 can be denser (less buoyant) with more solid particles, while FL2 can be more buoyant (less dense) due to the presence of more entrained gases.

The system 100 can deaerate fluids, that is, can separate most or all of the air or other gases from a fluid flow FL1 into a flow FL2 having most or all of the air or other gases and a flow FL3 having little entrained gas or air. This is suitable for many applications, including particle analysis systems. For example, in some particle sensors the detection sensitivity depends on the pipe diameter of the flow. Deaerating or increasing the concentration of particles in the oil flow allows a smaller diameter pipe and a smaller sensor to be used, providing improved particle detection sensitivity. The deaeration can reduce the noise in the sensor caused by air in the flow.

Some presently available real time optical fluid particle analysis systems, e.g., that described in U.S. Pat. No. 5,572,320, are best able to image particles located in the optical near field of the imaging system. For these systems, the conduit size necessary to carry the fluid viewed by that sensor is such that the particles size range is limited. Deaerating the flow with a flow separation system can broaden the applicability and effectiveness of the oil analysis system.

Figure 4A:
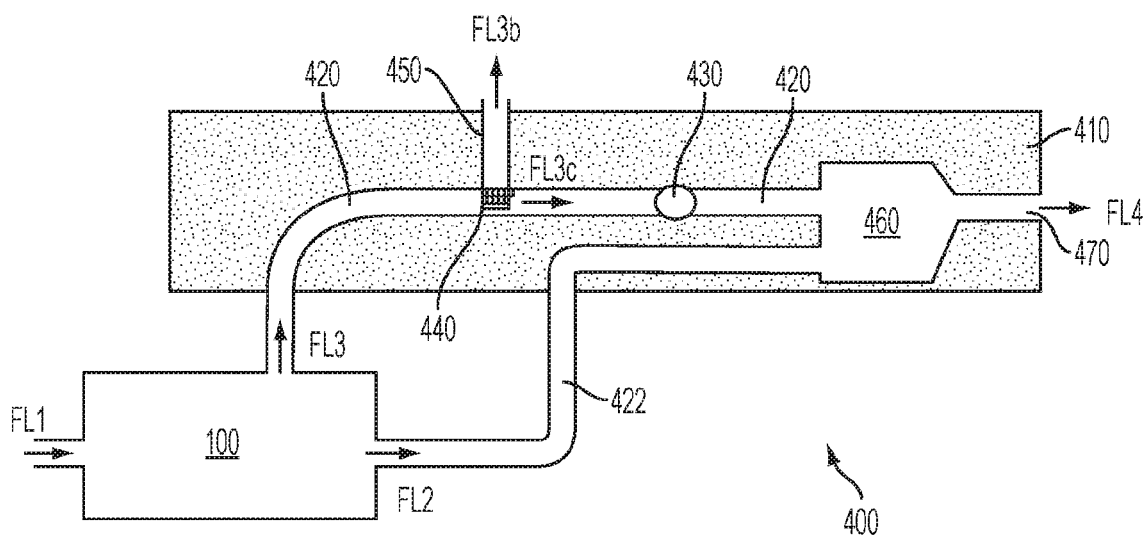
FIG. 4A illustrates an example of a flow separation system as a part of a real time fluid analysis system.

FIG. 4A shows the flow separation system 100 as a part of a larger fluid monitoring system 400.

The flow separation system 100 separates the flow into a denser flow FL3 containing the majority of the particles in the flow, and a more buoyant flow FL2. The particle enhanced flow FL3 can be introduced into a particle analysis system 410 directly or by way of connecting tubing or other fluid conduits. The particle enhanced flow FL3 flows through a passageway 420 and past an optional fluid sampling port 440, and the sample of flow FL3B can be extracted through conduit 450. The remaining flow FL3C, which is not removed at the sampling port, can be passed to a real time oil analysis system 430. In some embodiments, the oil analysis system can automatically analyze the size distribution of particles carried in the fluid. In this example, the flow FL3C that has passed through the real time oil analysis system is recombined with the higher buoyancy flow FL2 in a chamber 460 to form a re-aerated flow FL4. In this example, the higher buoyancy flow FL2 can be transmitted directly from the flow separation system 100 to the chamber 460, or can be further processed or analyzed by fluid analysis devices before passing into the chamber 460. The recombined flow FL4 flows out of the chamber 460 and exits the particle analysis system 410 through an exit port 470. The flow FL4 can be reintroduced into the fluid flow system to maintain total system volume, or discarded.

Figure 4B:
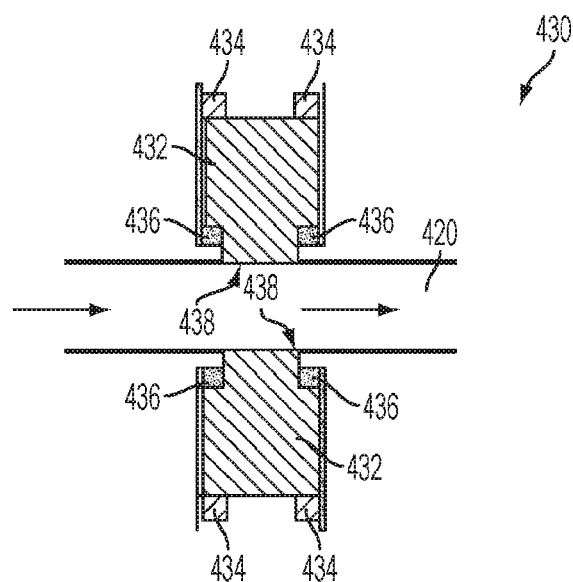
FIG. 4B is a cross sectional view of a viewing window suitable for use in the real time fluid analysis system of FIG. 4A.

FIG. 4B shows the details of one embodiment of a viewing port as positioned in the flow conduit 420 for the optical analysis system. Here, the heavier fluid flow FL3C flows through the conduit 420. Sets of windows 432 formed of suitably transparent and strong material are aligned opposite each other across the channel 420 in one or more pairs. The windows surfaces 438 are preferably flush with the interior walls of the channel 420 and are secured by a compressing seal system 436 against a lock mechanism 434 such that pressure variations in the channel will not cause the windows 432 to move. In one embodiment, the real time oil analysis system is an optical debris monitor such as that described in U.S. Pat. No. 5,572,320, U.S. Pat. No. 6,049,381, U.S. Pat. No. 8,582,100, or U.S. Pat. No. 8,654,329, and the disclosures of which are incorporated by reference in their entireties. The remaining components of the oil analysis system are not shown.

Figure 5:
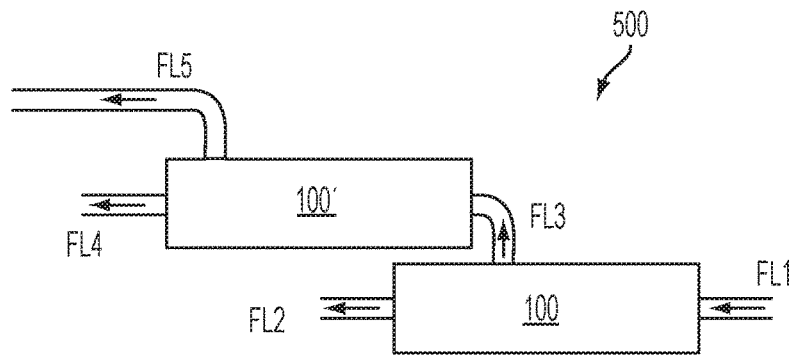
FIG. 5 illustrates an example of two flow separators arranged in sequence to create multiple flow channels, each having a fluid component of different buoyancy.

FIG. 5 illustrates a system in which two flow separators 100 are arranged in series. Here, the input flow FL1 is separated by separator 100 into a denser (less buoyant) flow FL3 and a more buoyant (less dense) flow FL2. In this example, the denser flow FL3 is then input into a second separator 100', which separates this flow into a denser flow FL5 and a less dense flow FL4. The separators 100 and 100' can have different design parameters. Additional separators can be added in-line with any of the output flows FL4, FL5, and FL2 to further separate the fluids. The separated flow channels can be recombined in a chamber or the flow in one or more of the final channels can be permanently isolated, with the remaining flows being recombined and returned to the original fluid system. For example, the most particle-laden flows could be permanently removed from the fluid system. In other examples, the more buoyant flow FL2 is input to an additional fluid separator.

Figure 6:
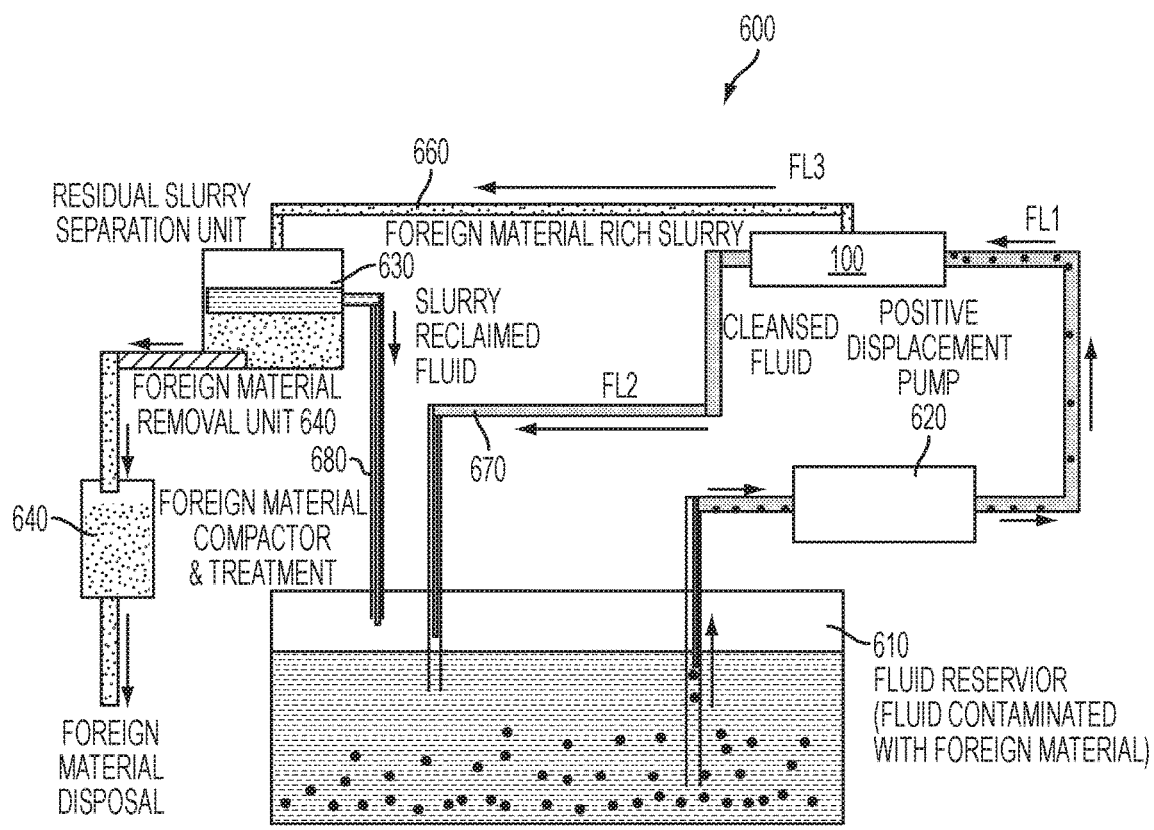
FIG. 6 illustrates an example of a fluid separation system as a part of a system for removing foreign material from a fluid reservoir.

FIG. 6 illustrates a system for removing foreign material from a fluid reservoir contaminated with the foreign material. Here, a positive displacement pump 620 draws contaminated fluid from a reservoir 610. The contaminated fluid enters the fluid separator 100, where the fluid is separated into flows FL2 and FL3, with the less buoyant (denser) fluid flow FL3 containing the particles of foreign material. The cleaned, more buoyant, fluid flow FL2 is returned to the reservoir by way of conduit 670. The particle-laden flow FL3 is directed to a residual slurry separation unit 630 by conduit 660, and the particles are removed from the slurry separation unit 630 by a foreign material removal unit 640. The reclaimed fluid from the slurry separation unit 630 is returned to the reservoir 610 via conduit 680. The particles removed from the flow can be transported to a foreign material compactor and treatment unit 640 for disposal. Fluid from which the particles have been removed is returned to the fluid reservoir 610. Although only one separation system 100 is shown, more than one separation system can be arranged in the system in series to remove a broader range of particle sizes. Several separation systems 100 can also be arranged in parallel, to clean a high volume of fluid more rapidly. This system 600 provides continuous operation of the separators without loss of fluid from the main reservoir.

The fluid reservoir 610 can be, for example, a fuel storage tank. Fuel storage tanks can have a tendency to contain microbial contamination.

Figure 7:
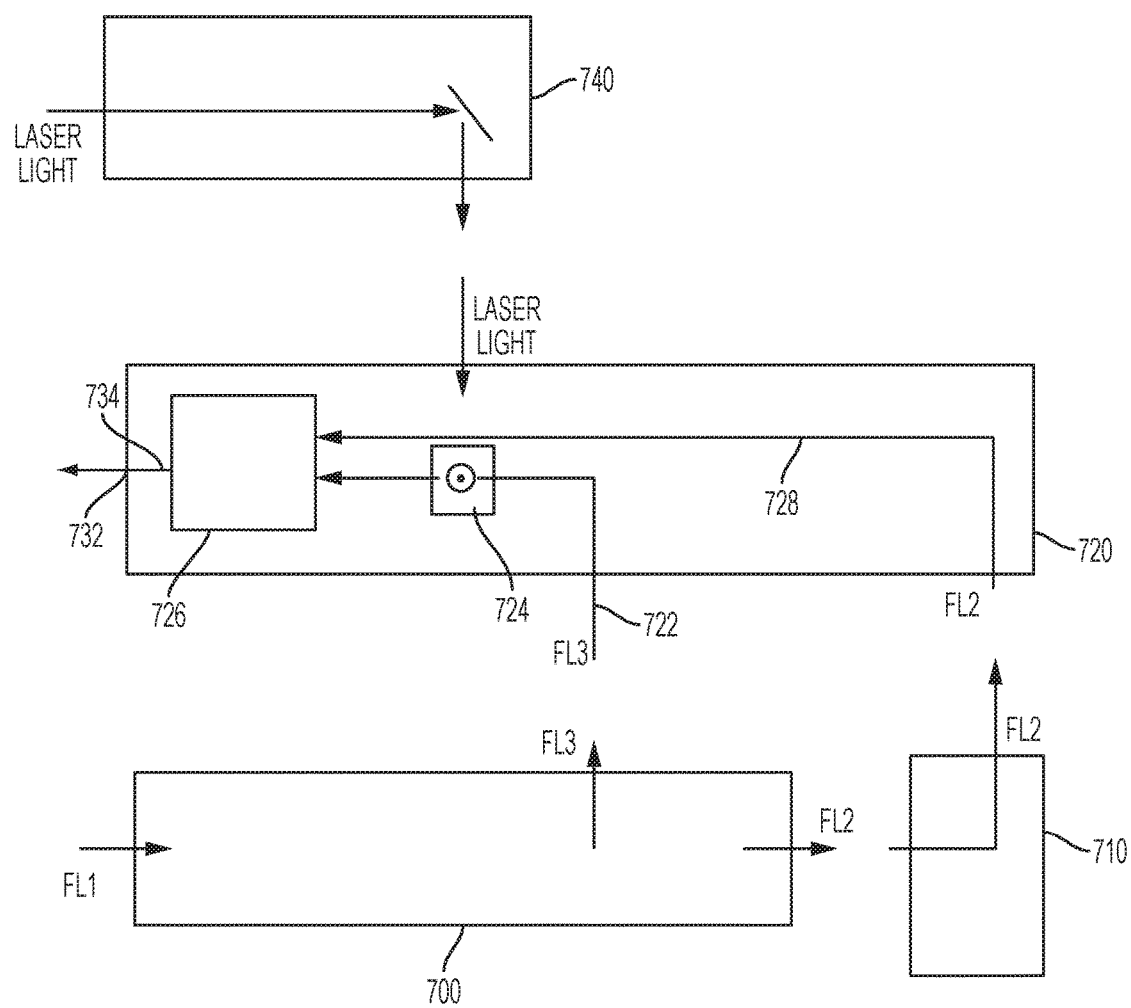
FIG. 7 illustrates an example of a fluid separation system as a part of a real-time optically based fluid analysis system.

FIG. 7 illustrates the flow and viewing components of a compact, optical oil analysis system. The flow separation module 700 can be as shown in FIGS. 1A-1D and FIGS. 2A-2B above, configured to separate an oil flow FL1 into a more buoyant flow FL2 and a more dense flow FL3. The more buoyant flow is introduced into a connector module 710, which physically connects the flow separation module 700 to the viewing and recombination module 720.

The connector module 710 can receive the axial flow FL2 and redirect it toward another component (e.g., toward an optical viewing and recombination module 720). The module can be integral with or affixed to the third member 160, and its size can keep the member 160 from sliding too far into the housing 110, thus maintaining the desired distance L between the member 140 and the horn shaped collector 166. The connector module 710 can be integral with the separation module 700, with the viewing and recombination module 720, or can be a separate component.

The viewing and recombination module has a passageway 722 that receives the particle laden flow FL3 and passes it through a viewing window 724, and subsequently into a recombination chamber 726. The viewing window 724 can be as shown in FIGS. 4A and 4B, and can be part of an optical oil analysis system described above. In this example, a passageway 728 transports the lower density fluid FL2 into the recombination chamber. A passageway 734 and outlet port 732 output the recombined fluid. In real time oil analysis systems, the recombined fluid can be returned to the main fluid reservoir, to avoid loss of system fluid. This embodiment can operate at pressures typical for oil lubrications systems of gas turbine engines, typically 80-150 psi, with an oil flow through the analysis system of approximately 10 gallons per minute.

The system 100 can also be considered to include three main components: the housing, a flow forming member, and a flow receiving member, with a separation chamber between the flow forming element and the flow receiving element. The flow forming member takes the input flow and gives it a helical or spiral shape that continues in the separation chamber. The flow receiving member can be considered to be the member 140 or the member 140 together with the member 120, because it receives the flow from the chamber. It is also noted that the member 120 and 140 do not have to be separate elements, but can be a single unitary element, either integral with each other or formed separately and subsequently joined together. The flow receiving member can be considered to correspond to the member 160.

Thus, the system for separating a multicomponent fluid into two or more flow channels, each containing components with different buoyancy, can comprise a housing having a fluid inlet at a first end and at least two outlets; a flow forming member configured to fit within the housing at the inlet end of the housing and having a flow passage therethrough with at least one helical channel in an outer cylindrical surface that directs the fluid into a helical flow direction near the outer circumference of the flow forming member as the fluid exits the flow forming member; and a flow receiving member configured to fit within the housing at an opposite end of the housing, having a central fluid passageway for carrying higher buoyancy fluid and extending through the member along a central axis, and at least one other fluid passageway for carrying lower buoyancy fluid with an inlet positioned radially outward of the inlet of the central fluid passageway; wherein a separation chamber is formed between faces of the flow forming member and the flow receiving member. In operation, the helical flow enters the separation chamber, and more buoyant portions of the flow move toward a central axis of the chamber and enter the central fluid passageway, and less buoyant portions of the flow continue in a helical path near the outer part of the chamber and bypass the entrance of the central fluid passageway and exit the system through the at least one other fluid passageway.

The components of the flow separation system are preferably formed of a strong material that is impervious to corrosion or other degradation from the fluid being carried. Some suitable materials include aluminum, stainless steel, and some plastics.

Several flow separation systems or stages may be cascaded to improve separation efficiency and general performance. The systems can be arranged in a stacked or cascaded configuration such that any selected component of the flow may be forwarded into a subsequent stage of a stacked separation system.

Further, individual separation systems can be configured to separate the flow into more than two flow portions by incorporating additional collection horns in the separation chamber.

These capabilities, when combined together, can broaden the performance envelope of the separator technology to address a wide variety of flow separation applications.

Figure 8A:
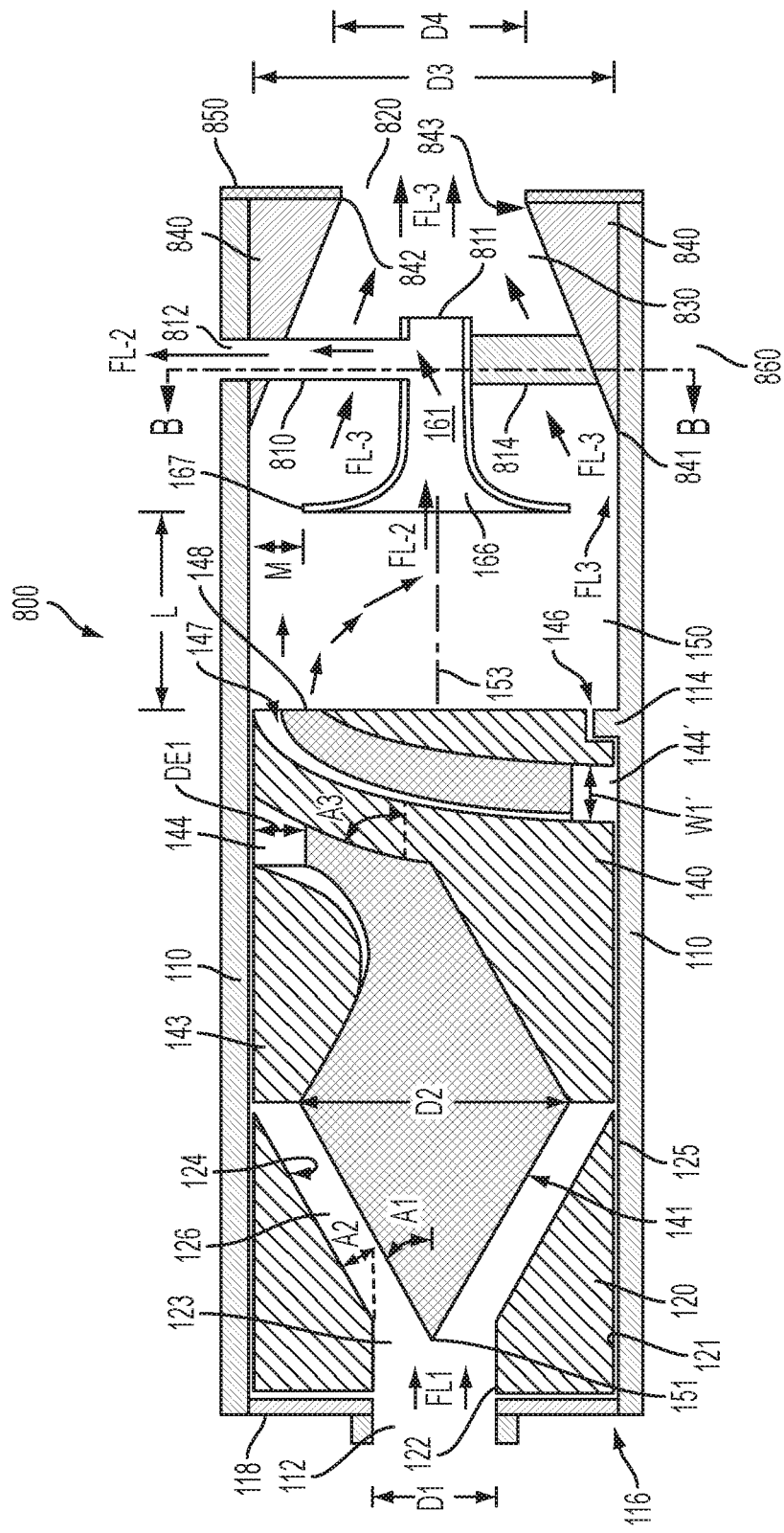
FIG. 8A is a schematic diagram of another example of a flow separation system for separating a fluid flow into two or more channels based on the fluid buoyancy.
Figure 8B:
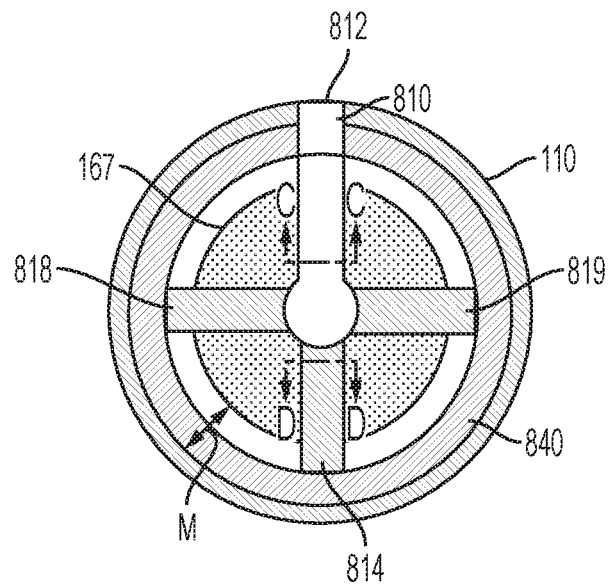
FIGS. 8B, 8C, and 8D show further detail of some internal components of the flow separation system of FIG. 8A.

FIG. 8A-8D illustrate an additional example of a flow separation system. The fluid separation system 800 shown in FIG. 8A-8D is suitable for a stacked arrangement of several separation systems, or can be used alone. As seen in FIG. 8A, the separation system 800 includes the same upstream members 120 and 140 as illustrated in FIGS. 1A-1D and FIGS. 2A-2B, with a different configuration of components downstream of the separation chamber. FIG. 8A is a cutaway view of the separation system, with part of the housing removed to show the shape of the interior components. FIG. 8B is a sectional view of the separation system, taken at a plane B-B through an outlet channel or passageway 810 and support struts 814, 818, and 819, looking in the upstream direction toward the separation chamber.

In this example, the "flow receiving member" 860 includes a wide collector or "horn shaped" collector 166, at least one support or strut, and an exit flow adapter module 840.

The horn shaped collector 166 is positioned along the axis of the collector 800 facing the separation chamber 150, to collect the more buoyant portion of the flow FL2 that has been driven toward the central part of the chamber. An outlet channel or passageway 810 is positioned downstream of the mouth of the collector 166. The channel or passageway 810 extends through the wall of the horn shaped collector and extends radially outward to an outlet 812 in the housing 110. The central passage 161 is closed at the far end 811 that is opposite the horn shaped collector 166, so the more buoyant fluid FL2 that enters the collector 166 is forced through the outlet channel 810, and exits the system 800 through the housing wall at the outlet 812.

Figure 8C:
Figure 8D:

The horn-shaped collector 166 is supported by several supports or struts 814, 818, and 819. Each support or strut is affixed at one end to the horn shaped collector and at the other end to an exit flow adapter module 840. The struts and the channel or passageway 810 can have low-drag cross sectional profiles such as the oval profiles shown in FIGS. 8C and 8D, or other low-drag profiles (e.g., an airfoil shape with the leading edge facing into the flow). Other profiles may also be suitable. Note that FIGS. 8C and 8D are not to scale.

The exit flow adapter module 840 has a cylindrical outer surface that fits closely within the housing, and an inner surface 843 that tapers inward to define a heavy-flow-component axial exit channel 830 with a decreasing cross section along the direction of flow. The diameter of the outlet 820 is D4. The decreasing diameter of the inner surface of the exit flow adapter module 840 accelerates the flow through the heavy-flow-component axial exit channel 830. In addition, the exit flow adapter module 840 can ensure the diameter D4 of the axial outlet 820 is suitable for connection to the inlet of another fluid separator, as discussed in later paragraphs. However, it is also envisioned that some applications may allow an exit flow adapter module with a constant diameter inner surface, or an inner surface with a different profile.

The heavier (less buoyant) portion of the flow FL3 bypasses the mouth 167 of the horn shaped collector 166 and flows generally axially past the struts toward the axial outlet 820 at the far end of the housing 110.

The flow receiving member 860, including the exit flow adapter module, one or more support struts, and the horn-shaped collector, is preferably held in position within the housing to maintain the desired separation chamber length L and to align the channel 810 with the opening in the housing. A threaded end cap 850 can maintain the flow receiving member 860 in position. Another option is to use a locking mechanism such as a locking pin, protuberance, or flange to hold the flow receiving member in place. In other embodiments, the flow receiving member can be adhesively attached to the housing.

The distance L affects the dwell time of the flow within the chamber 150, and together with the angle and dimensions of the channel 144 and the helix angle A3, controls the amount of separation between the partial flows FL2 and FL3. The distance M between the outer rim 167 of the horn shaped collector 166 and the inner wall of the housing 110 determines how much of the more buoyant flow component will be collected by the horn-shaped collector 166, and how much of the less buoyant flow component will bypass the collector 166 and exit through the outlet 820.

The axial flow of the less buoyant flow component FL3 past the collection horn 166, the struts 814, 818, and 819, and the wall of the exit channel 810 allows the less buoyant fluid to exit the separator 800 and to be directly input to another separation system arranged downstream of the separator 800, as is discussed in later paragraphs.

Figure 9:
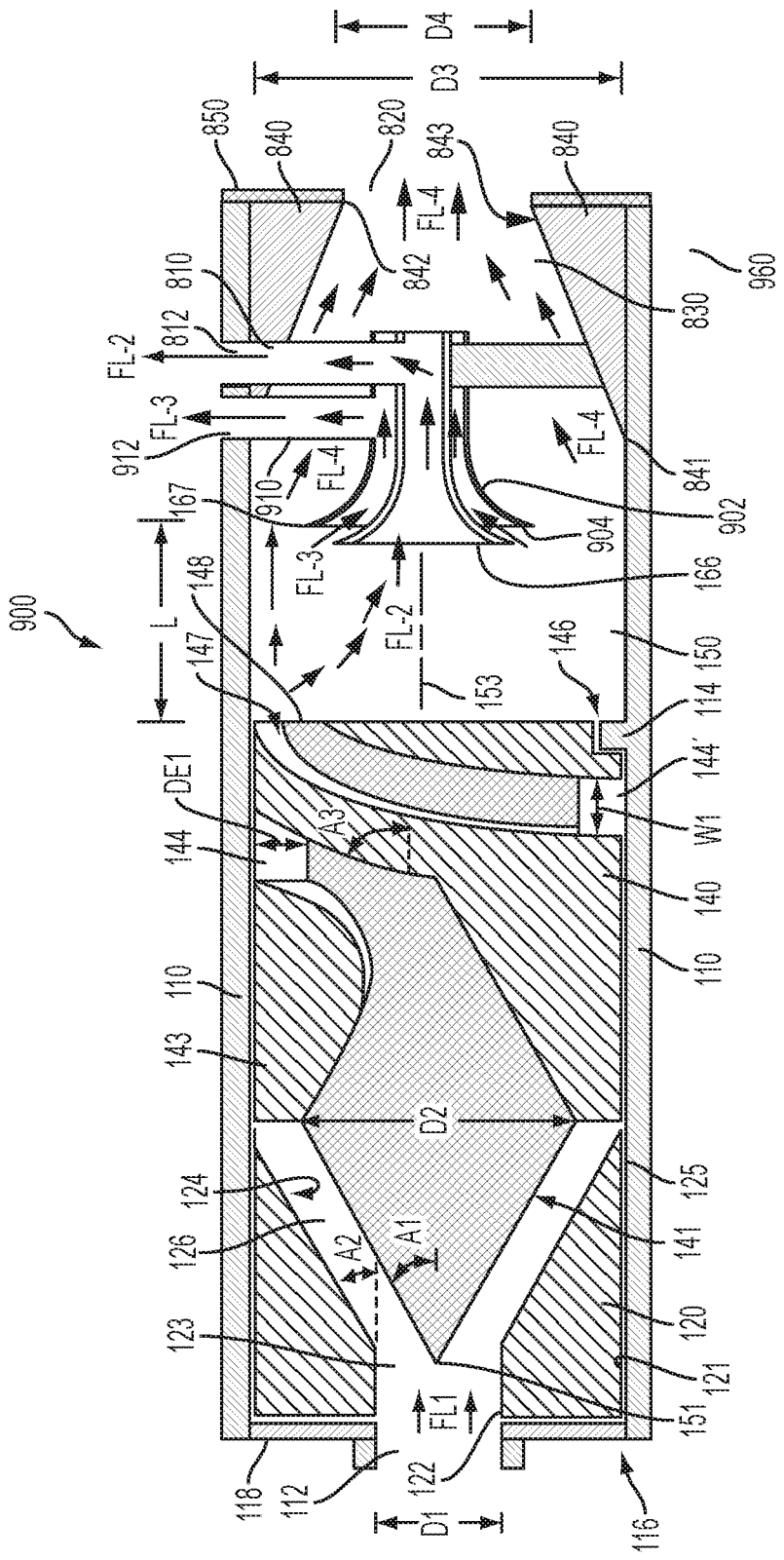
FIG. 9 illustrates another embodiment of a flow separation system for separating a fluid flow into two or more channels based on the fluid buoyancy.

FIG. 9 illustrates another example of a fluid separator system. In this example, the flow receiving member 960 includes all the components shown in FIG. 8, plus a second collection horn 902 that concentrically surrounds the central collection horn 166 and an exit channel 910 that extends from the second collection horn 902 radially outward through the housing 110. The second collection horn 902 has a mouth 904 with a larger diameter than that of the central collection horn 166, and collects fluid FL-3 that is heavier (less buoyant) than the fluid FL-2 collected by the central collection horn 166, but lighter than the fluid FL-4 that bypasses the second collection horn mouth 904. Each of the fluid flows FL-2 and FL-3 collected by the collection horns is transported to a separate outlet at the outer circumferential surface of the housing 110. The diameter and position of the mouth 904 of the second collection horn 902 determines how much of the heaviest flow FL-4 bypasses the collection horns and exits the system at the axial outlet 820. In this example, the mouth 904 of the second collection horn is slightly downstream of the mouth 167 of the central collection horn 166, but it could be located at a different axial position depending the desired collection rate and buoyancy of the fluid to be collected by the second collection horn 902.

Instead of outputting the lighter fluids to outlets at the side of the housing, in both of the embodiments shown in FIGS. 8A-8D and FIG. 9, the channels 810, 910 could extend through the exit flow adapter module 840 to separate outlets at the outlet end of the separator.

The fluid separation systems 100, 800, and 900 described herein rely on the inlet fluid pressure to drive the fluid through the helical spiral channel in the flow forming member, which allows the heavier (less buoyant) fluid and the lighter (more buoyant fluid) to separate in the separation chamber and to be collected by separate collectors in the flow-receiving member. Each of these systems can be configured to operate at a pressure of above about one atmosphere (approximately 14.7 pounds per square inch). The separators can operate at higher inlet pressures, for example, in the range of 80-150 psi, or higher. In one example, the system 100, 800, or 900 has a diameter of about one inch, and operates at an inlet pressure of about 30 psi (approximately 2 atmospheres), with a cone angle A1 of about 30 degrees.

As discussed above, the system geometry can be varied based on the speed of the fluid flow FL1 at the inlet and the centrifugal "g-force" necessary to create the desired amount of flow separation in the separation chamber. For operation at lower inlet pressures, the system may be configured with a smaller cone angle, longer and thinner helical channels, additional helical channels, and a smaller diameter.

Each of the systems illustrated in FIGS. 1A-1D, 8A-8D, and 9 can be arranged in a cascaded or stacked manner.

Figure 10:
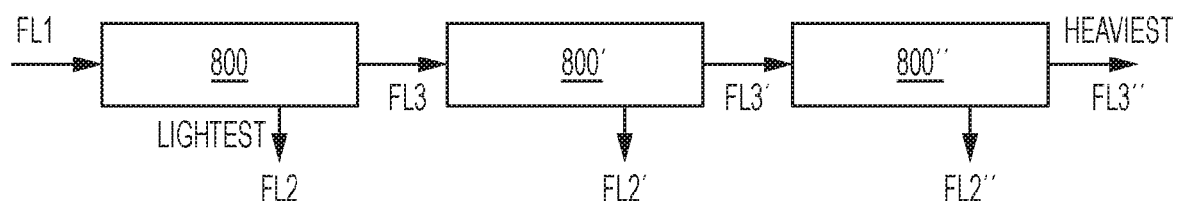
FIGS. 10 and 11 illustrate cascaded fluid separation systems.

FIG. 10 illustrates the stacking capability of a separator system by showing three cascaded separators 800, 800', and 800". In this example, the heavier (less buoyant) fluid FL3 exits the first separator 800 and enters the inlet of the second separator 800'. The second separator 800' further separates the flow FL3 into a lighter (more buoyant) flow portion FL2' and a heavier flow portion FL3'. The heavier flow portion FL3' enters the inlet of the third separator 800", and is further separated into a lighter flow portion FL2" and a heavier flow portion FL3". In this manner, the cascaded separators separate the flow into separate streams of differing buoyancy, and concentrate the heaviest flow FL3" at an axial outlet of the final separator.

Figure 11:
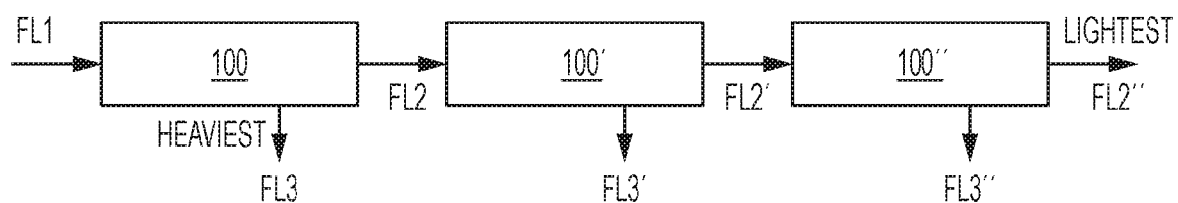

FIG. 11 illustrates three separators 100, 100', and 100" arranged in a cascaded or stacked configuration. In this example, and as illustrated in FIG. 1A, the heavier fluid exits each separator from an outlet port at the circumferential surface of each separator housing, and the lighter fluid exits each separator at the far end opposite the inlet end. Thus, the lightest (most buoyant) fluid FL2" exits at an axial outlet of the final separator. In each example, there may be more or fewer separators.

Figure 12:
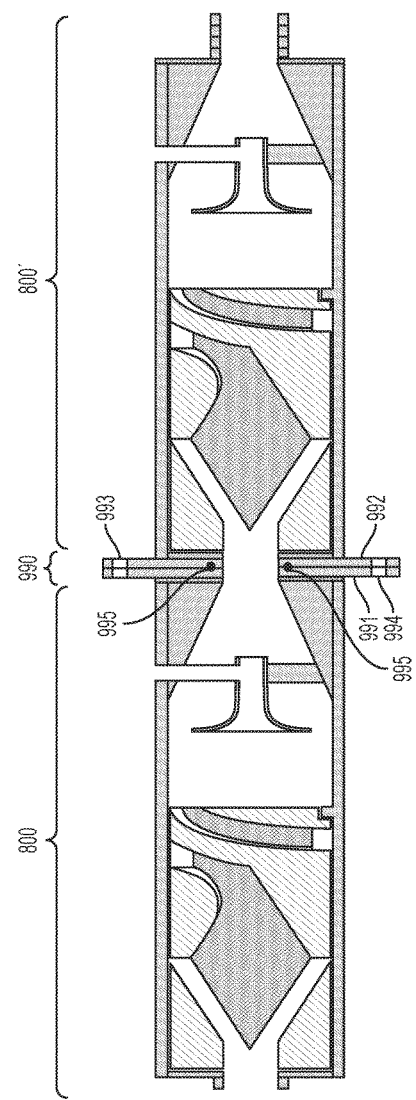
FIG. 12 illustrates an example of a cascaded fluid separation system in more detail.

FIG. 12 illustrates in more detail two axial fluid separators 800 and 800' arranged in a cascaded manner. The first separator and second separator are aligned along the same central axis, and the axial outlet of the first separator feeds the less buoyant (heavier) fluid directly into the fluid inlet of the second separator. A connector 990 joins the outlet end of the separator 800 to the inlet end of the second separator. In this example, the connector includes two flanges or plates 991, 992. Each flange or plate is connected to one of the separators, and the flanges or plates have a planar facing surface held in contact by bolts or screws (not shown) that extending through aligned holes 993, 994 that extend through both flanges or plates. In this example, a fluid seal is provided by a compliant sealing member 995 positioned between the flanges or plates in a groove in one of the flanges or plates, and compressed by the bolts, screws, or other clamping device that holds the flanges or plates together. The compliant sealing member can be, but is not limited to, an o-ring, a gasket, or a metal seal. The fluid separators 800, 800' can be joined by various other mechanical connectors, or can be adhered or bonded together.

In this example, the exit diameter of the axial outlet of the first separator is approximately the same as the inlet diameter of the inlet of the second separator. Because the separators are connected directly together, with no bends in the fluid path between the connectors, the fluid experiences little or no pressure drop as it passes from one separator to the next. Additional separators can be added in a similar or identical manner downstream of the second separator or upstream of the first separator. The maximum number of separators is determined by the pressure drop across each separator and the inlet pressure at the first separator. As shown in this example, no pumps are positioned between the connectors to increase the inlet pressure of the fluid entering the second separator. The cascaded or stacked separators can be considered to be individual stages of a larger separation system.

It is also noted that while the description of the separator systems described above identifies a housing with internal components that are separately manufactured and subsequently inserted into the housing, it is also envisioned that the entire separator or subassemblies can be formed integrally by manufacturing processes including, but not limited to, casting, forging, machining, 3D printing, other additive manufacturing processes, or any combinations thereof. In particular, flow separation systems can be formed of a single component. Instead of a separate housing and internal members shown in FIGS. 1A-1D, 2A-2B, 8A-8D, and 9, the flow passages can be formed within a single piece of material by one or more of these manufacturing processes.

Although the present teachings have been described with respect to various embodiments, it should be realized these teachings are also capable of a wide variety of further and other embodiments.

What is claimed as new and desired to be protected by Letters Patent of the United States is:

1. A cascaded flow separation system having at least a first flow separator and a second flow separator arranged in series, each separator having a central axis with both a fluid inlet and a first axial fluid outlet arranged at opposite ends of the separator along the central axis of the separator, each separator having at least a second fluid outlet, the separator configured to separate fluid portions of different buoyancies into flow paths out of the first fluid outlet and the second fluid outlet, and each separator having a housing with an approximately constant inner diameter, the separators being operatively coupled together, with the first axial fluid outlet of the first separator coupled to the fluid inlet of the second separator, each separator having a flow forming member with a helical channel on an outer surface thereof, a flow receiving member with concentric collectors configured to receive flow portions of different buoyancies, and a separation chamber arranged between the flow forming member and the flow receiving member, the separation chamber also having the approximately constant inner diameter of the separator housing, the concentric collectors comprising a horn shaped collector with an axial passageway that is aligned along the central axis, and each separator operating by using inlet fluid pressure to passively drive the fluid portions through the helical channel, wherein the first axial fluid outlet of the first separator is directly connected to the fluid inlet of the second separator, without a pump between the separators.

2. The separation system of claim 1, further having a third flow separator that operates by using the inlet fluid pressure to drive the fluid portions through the helical channel, wherein the second fluid outlet of the first separator is off-axial and connected to the fluid inlet of the third separator.

3. The separation system of claim 1, wherein the first separator has a flow outlet diameter equal to a flow inlet diameter of the second separator.

4. The separation system of claim 1, wherein each of the first flow separator and the second flow separator is formed separately and subsequently assembled.

5. The separation system of claim 1, wherein the first flow separator and the second flow separator are formed as an integral unit.

6. The separation system of claim 1, wherein at least one of the first flow separator and the second flow separator are formed by at least one of bonding separately formed pieces together, casting, forging, machining, or an additive manufacturing process.

7. The separation system of claim 6, wherein the additive manufacturing process is a three-dimensional printing process.

8. A method for separating a fluid into at least two portions of differing buoyancy using a cascaded flow separation system having at least a first flow separator and a second flow separator arranged in series,
each separator having a fluid inlet and a first axial fluid outlet arranged at opposite ends of the separator along a central axis of the separator, each separator having at least a second fluid outlet, each separator configured to separate fluid portions of different buoyancies into flow paths out of the first fluid outlet and the second fluid outlet, and each separator having a housing with an approximately constant inner diameter, the separators being operatively coupled together with the first axial fluid outlet of the first separator coupled directly to the fluid inlet of the second separator,
each separator having a flow forming member with a helical channel on an outer surface thereof, a flow receiving member with concentric collectors configured to receive flow portions of different buoyancies, and a separation chamber arranged between the flow forming member and the flow receiving member, the separation chamber also having the approximately constant inner diameter of the separator housing, the concentric collectors comprising a horn shaped collector with an axial passageway that is aligned along the central axis,
the method comprising:
introducing a pressurized fluid into the inlet of the first separator at a pressure such that the first separator separates the fluid into at least two channels carrying fluid portions of differing buoyancy, and the second separator separates fluid that enters the inlet of the second separator from the first separator into at least two channels carrying fluids of differing buoyancy, wherein each separator operates by using the pressure to passively drive the fluid portions through the helical channel, and wherein the first axial fluid outlet of the first separator is directly connected to the fluid inlet of the second separator, without a pump between the separators.

9. The method of claim 8, the cascaded flow separation system further having a third flow separator that operates by using the inlet fluid pressure to drive the fluid portions through the helical channel, wherein the second fluid outlet of the first separator is off-axial and connected to the fluid inlet of the third separator, and wherein the third separator separates fluid that enters the inlet of the third separator from the first separator into at least two channels carrying fluids of differing buoyancy.

10. The method of claim 8, wherein the first separator has a flow outlet diameter equal to a flow inlet diameter of second separator.

11. The method of claim 8, wherein each of the first flow separator and the second flow separator is formed separately and subsequently assembled.

12. The method of claim 8, wherein the first flow separator and the second flow separator are formed as an integral unit.

13. The method of claim 8, wherein at least one of the first flow separator and the second flow separator are formed by at least one of bonding separately formed pieces together, casting, forging, machining, or an additive manufacturing process.

14. The method of claim 13, wherein the additive manufacturing process is a three-dimensional printing process.

15. A cascaded flow separation system having at least a first flow separator and a second flow separator arranged in series,
each separator having a fluid inlet along a central axis and a first fluid outlet that is off-axial, each separator having at least a second fluid outlet, the separator configured to separate fluid portions of different buoyancies into flow paths out of the first fluid outlet and the second fluid outlet, and each separator having a housing with an approximately constant inner diameter,
the separators being operatively coupled together, with the first fluid outlet of the first separator coupled to the fluid inlet of the second separator,
each separator having a flow forming member with a helical channel on an outer surface thereof, a flow receiving member with concentric collectors configured to receive flow portions of different buoyancies, and a separation chamber arranged between the flow forming member and the flow receiving member, the separation chamber also having the approximately constant inner diameter of the separator housing, the concentric collectors comprising a horn shaped collector with an axial passageway that is aligned along the central axis.

16. The separation system of claim 15, further having a third flow separator that operates by using the inlet fluid pressure to passively drive the fluid portions through the helical channel, wherein the second fluid outlet of the first separator is along the central axis of the separator and directly connected to the fluid inlet of the third separator.

17. The separation system of claim 15, wherein the first separator has a flow outlet diameter equal to a flow inlet diameter of the second separator.

18. The separation system of claim 15, wherein each of the first flow separator and the second flow separator is formed separately and subsequently assembled.

19. The separation system of claim 15, wherein the first flow separator and the second flow separator are formed as an integral unit.

20. The separation system of claim 15, wherein at least one of the first flow separator and the second flow separator are formed by at least one of bonding separately formed pieces together, casting, forging, machining, or an additive manufacturing process.

21. The separation system of claim 20, wherein the additive manufacturing process is a three-dimensional printing process.

* * * * *